United States Patent
Kato (10) Patent No.: US 9,641,667 B2
(45) Date of Patent: May 2, 2017

(54) METHOD OF RELEASING A LOCKED STATE OF A TERMINAL DEVICE USING TAPPING

(71) Applicant: NEC CASIO Mobile Communications, Ltd., Kawasaki-shi, Kanagawa (JP)

(72) Inventor: Hiromu Kato, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 9 days.

(21) Appl. No.: 14/440,400

(22) PCT Filed: Nov. 29, 2013

(86) PCT No.: PCT/JP2013/082135
§ 371 (c)(1),
(2) Date: May 4, 2015

(87) PCT Pub. No.: WO2014/091944
PCT Pub. Date: Jun. 19, 2014

(65) Prior Publication Data
US 2015/0288803 A1    Oct. 8, 2015

(30) Foreign Application Priority Data
Dec. 14, 2012  (JP) ................. 2012-273907

(51) Int. Cl.
*H04W 12/06* (2009.01)
*H04M 1/725* (2006.01)
(Continued)

(52) U.S. Cl.
CPC ........ *H04M 1/72577* (2013.01); *G06F 21/31* (2013.01); *H04L 63/08* (2013.01);
(Continued)

(58) Field of Classification Search
CPC ...... G06F 21/31; G06F 3/0487; G06F 1/1694; G06F 21/44; G06F 21/60; G06F 21/78;
(Continued)

(56) References Cited

U.S. PATENT DOCUMENTS 8,504,842 B1 *  8/2013  Meacham ............... G06F 21/36
                                                                 713/183
8,904,479 B1 * 12/2014  Johansson .............. G06F 21/36
                                                                 726/2
(Continued)

FOREIGN PATENT DOCUMENTS

CN    101371258 A    2/2009
JP    2007235867 A    9/2007
(Continued)

OTHER PUBLICATIONS

Extended European Search Report for EP Application No. EP13861935.8 dated on Jun. 13, 2016.
(Continued)

*Primary Examiner* — Meless Zewdu (57) ABSTRACT

In an information terminal device, tap information in accordance with a pattern of a tapping operation of a user is acquired, and unlocking information is acquired in which unlocking tap information items, each of which functions as an unlocking key for each of applications, are associated with the corresponding applications. If a predetermined condition is satisfied, the present device is changed from a normal state to a locked state. If the present device is in the normal state and the acquired tap information coincides with any one of the unlocking tap information items, the present device is changed from the locked state to a limited unlocked state in which at least the application associated with the relevant unlocking tap information item is operable.

7 Claims, 6 Drawing Sheets

(51) Int. Cl.
*G06F 21/31* (2013.01)
*H04M 1/66* (2006.01)
*H04W 12/02* (2009.01)
*H04L 29/06* (2006.01)

(52) U.S. Cl.
CPC ............ *H04L 63/168* (2013.01); *H04M 1/66* (2013.01); *H04W 12/02* (2013.01); *H04W 12/06* (2013.01)

(58) Field of Classification Search
CPC .... H04M 1/66; H04M 1/72577; H04M 1/725; H04L 63/168; H04L 63/08; H04W 12/06; H04W 12/02; H04W 12/00; H04W 12/08
See application file for complete search history.

(56) References Cited

U.S. PATENT DOCUMENTS

| | | | |
|---|---|---|---|
| 2008/0136587 A1 | 6/2008 | Orr | |
| 2011/0053641 A1* | 3/2011 | Lee | G06F 1/1626 455/556.1 |
| 2011/0130170 A1* | 6/2011 | Han | G06F 1/1694 455/566 |
| 2011/0159844 A1* | 6/2011 | Gillet | H04M 1/673 455/411 |
| 2011/0283241 A1 | 11/2011 | Miller et al. | |
| 2012/0036556 A1* | 2/2012 | LeBeau | G06F 3/048 726/3 |
| 2012/0084734 A1* | 4/2012 | Wilairat | G06F 21/36 715/863 |
| 2013/0101127 A1* | 4/2013 | Buchmann | H04R 29/005 381/58 |
| 2013/0244574 A1* | 9/2013 | Okuno | H04M 1/67 455/26.1 |
| 2014/0143859 A1* | 5/2014 | Linge | G06F 21/36 726/19 |
| 2015/0082252 A1 | 3/2015 | Chaudhri et al. | |

FOREIGN PATENT DOCUMENTS

| | | |
|---|---|---|
| JP | 2009134482 A | 6/2009 |
| JP | 2012181847 A | 9/2012 |
| JP | 2013228953 A | 11/2013 |
| WO | 2012096075 A1 | 7/2012 |

OTHER PUBLICATIONS

International Search Report for PCT Application No. PCT/JP2013/082135, mailed on Feb. 10, 2014.
Chinese Office Action for CN Application No. 201380064525.5 issued on Nov. 28, 2016 with English Translation.

* cited by examiner

<UNLOCKING INFORMATION TABLE>

| APPLICATION | UNLOCKING TAP INFORMATION | DURING EXECUTION OR NON-EXECUTION |
|---|---|---|
| MAIL APPLICATION | TAP PATTERN A | NON-EXECUTION |
| MAP APPLICATION | TAP PATTERN B | EXECUTION |
| MUSIC REPRODUCTION APPLICATION | TAP PATTERN C | EXECUTION |
| ⋮ | ⋮ | ⋮ |
| TOTAL UNLOCKING | TAP PATTERN D | — |

UNLOCKING TAP INFORMATION GENERATED UTILIZING MUSIC REPRODUCTION APPLICATION

METHOD OF RELEASING A LOCKED STATE OF A TERMINAL DEVICE USING TAPPING

This application is a National Stage Entry of PCT/JP2013/082135 filed on Nov. 29, 2013, which claims priority from Japanese Patent Application 2012-273907 filed on Dec. 14, 2012, the contents of all of which are incorporated herein by reference, in their entirety.

TECHNICAL FIELD

The present invention relates to an information terminal device, an information terminal control method, and a program, which are utilized to release a locked state limitedly for currently active applications.

BACKGROUND ART

Multifunctional information terminal devices (simply called "information terminal devices" below) such as smartphone can operate lots of applications and thus are convenient. However, abuse of personal information when such an information terminal device is taken by a stranger and privacy issues are becoming serious problems.

From this point of view, typical information terminal devices in recent years have, for example, a function of automatically changing to a state (called "locked state" below), in which all applications are inactive, when no input operation has been detected for a specific period of time. In order to return from such a locked state to a state in which the applications can be used normally, some information terminal devices are designed to request an operation of inputting unlocking information for user authentication (i.e., an unlocking operation).

For the unlocking operation, the user is often requested to display an unlocking screen, which is utilized for unlocking, on a display unit and then input the unlocking information (which requires secrecy) onto the unlocking screen. However, an authentication process requiring such multiple inputting steps is complicated and increases the risk of the unlocking information viewed by a stranger (i.e., information leakage).

As a technique related to the locking function, an information terminal device has been proposed in which in the authentication process for the unlocking, a preregistered specific piece of music is reproduced, and authentication is performed by inputting a predetermined operation in accordance with a rhythm pattern of the reproduced music (Patent Document 1).

Accordingly, the user can input password information in a simpler manner while ensuring confidentiality. In addition, Patent Document 1 proposes a function of making only a specific function among the functions of the information terminal device be limitedly available based on the authentication process according to the rhythm pattern.

PRIOR ART DOCUMENT

Patent Document

Patent Document 1: Japanese Unexamined Patent Application, First Publication No. 2007-235867.

DISCLOSURE OF INVENTION

Problem to be Solved by the Invention

Generally in the above-described locking function, if a non-input state has continued for a predetermined period of time, the information terminal device is shifted to the locked state even when the user is operating some applications (it may not be shifted to the locked state in certain circumstances such as being during video playback utilizing an application for video).

The primary purpose for the user to release such a locked state is to restart an application which was active when the device was shifted to the locked state. For example, in a situation in which the user is proceeding to a destination while operating a map application (simply called "map application" below), the information terminal device which is executing the map application may be shifted to the locked state while the user is walking. In this case, even if the user only wants to quickly check the map, the user must perform the unlocking operation for authentication each time the map is checked.

As described above, even though the application which the user wants to use after the locked state is released is clear, the user is forced to perform a complex operation, that is, to execute a standard authentication process each time the application is used. Furthermore, after the ordinary unlocking, even applications which the user does not intend to use are available. Therefore, if the unlocking information is leaked, there is a risk that all applications may be used. Here, for the information terminal device disclosed in Patent Document 1, it is not assumed to flexibly perform the limited unlocking of the application which was being executed before the shift to the locked state.

In addition, even when tapping a display unit of a smartphone based on the designated rhythm pattern, a stranger who views the tapping may decode the rhythm pattern if the tapping operation is predetermined. Therefore, although the confidentiality for the authentication process is improved, the obtained effect is not sufficient.

In light of the above circumstances, an object of the present invention is to provide an information terminal device, an information terminal control method, and a program, which can solve the above-described problem.

Means for Solving the Problem

In order to solve the above problem, the present invention provides an information terminal device comprising:

a tap information acquiring unit that acquires tap information in accordance with a pattern of a tapping operation of a user;

an unlocking information acquiring unit that acquires unlocking information in which unlocking tap information items, each of which functions as an unlocking key for each of applications available in the present device, are defined in association with the corresponding applications; and a state change unit wherein:

if a predetermined condition is satisfied, the state change unit changes the state of the present device from a normal state to a locked state in which the applications are not available; and if the present device is in the normal state and the tap information acquired by the tap information acquiring unit coincides with any one of the unlocking tap information items of the unlocking information, the state change unit changes the state of the present device from the locked state to a limited unlocked state in which at least the application associated with the relevant unlocking tap information item is operable.

The present invention also provides an information terminal control method comprising:

acquiring tap information in accordance with a pattern of a tapping operation of a user;

acquiring unlocking information in which unlocking tap information items, each of which functions as an unlocking key for each of applications available in an information terminal device, are defined in association with the corresponding applications:

changing, if a predetermined condition is satisfied, the state of the information terminal device from a normal state to a locked state in which the applications are not available; and changing, if the information terminal device is in the normal state and the tap information acquired by the tap information acquiring coincides with any one of the unlocking tap information items of the unlocking information, the state of the information terminal device from the locked state to a limited unlocked state in which at least the application associated with the relevant unlocking tap information item is operable.

The present invention also provides a program utilized to make a computer of an information terminal device function as:

a tap information acquiring unit that acquires tap information in accordance with a pattern of a tapping operation of a user;

an unlocking information acquiring unit that acquires unlocking information in which unlocking tap information items, each of which functions as an unlocking key for each of applications available in the information terminal device, are defined in association with the corresponding applications; and a state change unit wherein:

if a predetermined condition is satisfied, the state change unit changes the state of the information terminal device from a normal state to a locked state in which the applications are not available; and if the information terminal device is in the normal state and the tap information acquired by the tap information acquiring unit coincides with any one of the unlocking tap information items of the unlocking information, the state change unit changes the state of the information terminal device from the locked state to a limited unlocked state in which at least the application associated with the relevant unlocking tap information item is operable.

Effect of the Invention

In accordance with the present invention, it is possible to provide an information terminal device having a locking function that minimizes the risk of information leakage without inconveniencing the user.

MODE FOR CARRYING OUT THE INVENTION

First embodiment

Below, an information terminal device according to a first embodiment of the present invention will be explained with reference to the drawings.

Figure 1:
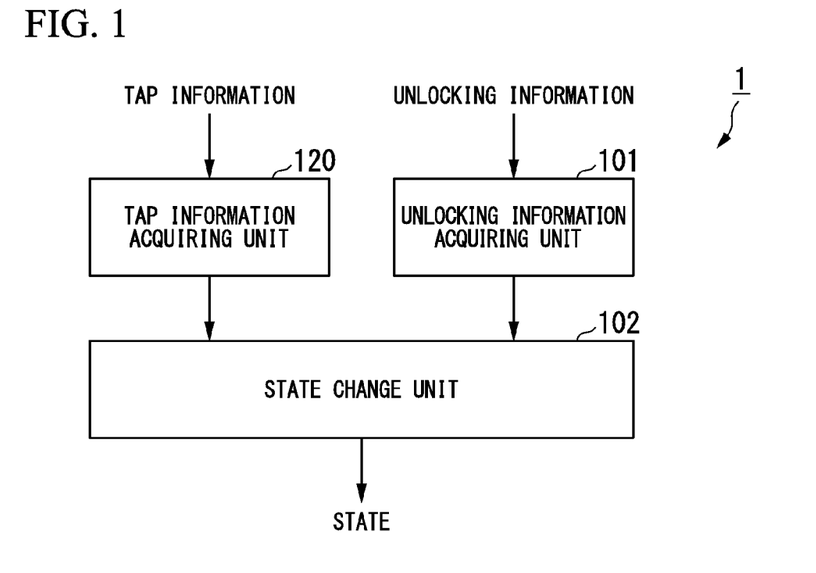
FIG. 1 is a diagram showing a minimum configuration of the information terminal device according to a first embodiment of the present invention.

FIG. 1 is a diagram showing a minimum configuration of the information terminal device according to the first embodiment of the present invention. In this figure, reference numeral 1 indicates the information terminal device. As shown in FIG. 1, the information terminal device 1 has at least an unlocking information acquiring unit 101, a state change unit 102, and a tap information acquiring unit 120.

The tap information acquiring unit 120 is a functional unit utilized to acquire tap information corresponding to a pattern of tapping operation performed by the user. The tap information acquiring unit 120 is, for example, a touch panel display as employed by a popular smartphone or the like.

Usually, a touch sensor is provided on a surface of a display unit of the above-described touch panel display and can detect a tapping (or touch) operation by the user due to a variation in capacitance (or resistance). However, in the present embodiment, the means for acquiring such tap information is not limited to the above-described mode. The tap information acquiring unit 120 may be an ordinary push-down button, where the tap information is acquired based on a rhythm pattern for the timing of the pushing of the push-down button. Furthermore, the tap information may be acquired by utilizing an acceleration sensor that detects a variation in the posture of the body of the information terminal device 1, which moves up and down, or the like, according to the tapping operation of the user.

In addition, the term "tapping operation" refers to a finger's light touch on the touch panel and then immediate release of the finger. However, in the present embodiment, the tapping operation is not limited to such a manner and includes all manners equivalent to the manner. For example, when the tap information acquiring unit 120 is formed by utilizing the above-described push-down button, the tapping operation refers to an operation of actively pushing down a predetermined button and then immediately releasing the finger from the button. If the touch panel display is highly sensitive to detect the position of a finger which does not actually touch the target, the tapping operation includes a non-contact input operation.

The unlocking information acquiring unit 101 acquires unlocking information in which unlocking tap information utilized as an unlocking key for each of various applications executed by the present device (i.e., the information terminal device 1) is associated with the relevant application.

The unlocking information is an information table in which each identifier that indicates a specific application is associated with the unlocking tap information corresponding to this application. Among various tap information items input by the user, the unlocking tap information is tap information that functions as an unlock key utilized to limitedly unlock the locked information terminal device 1 for a predetermined application.

When a predetermined condition is satisfied, the state change unit 102 changes the state of the present device from a "normal state" to a "locked state" in which all applications are not available. Additionally, when the present device is in the locked state, the state change unit 102 has a function of determining whether or not the tap information acquired by the tap information acquiring unit 120 coincides with any unlocking tap information.

Although it will be explained in detail later, the "normal state" is a state in which the user can freely operate available applications.

In order to perform the above determination, the state change unit 102 refers to the unlocking information acquired by the unlocking information acquiring unit 101. The above "predetermined condition" may be defined as a condition such that no input operation onto the information terminal device 1 has been detected for a specific period of time.

Additionally, in the present embodiment, the state change unit 102 may perform the shift to the locked state based on a predetermined setting operation of the user.

If the tap information acquired by the tap information acquiring unit 120 coincides with any unlocking tap information included in the unlocking information, the state change unit 102 changes the state of the present device from the locked state to a "limited unlocked state" in which at least an application associated with the relevant unlocking tap information is available.

Here, the above normal state, the locked state, and the limited unlocked state, any of which the information terminal device 1 has, will be explained later in detail.

Figure 2:
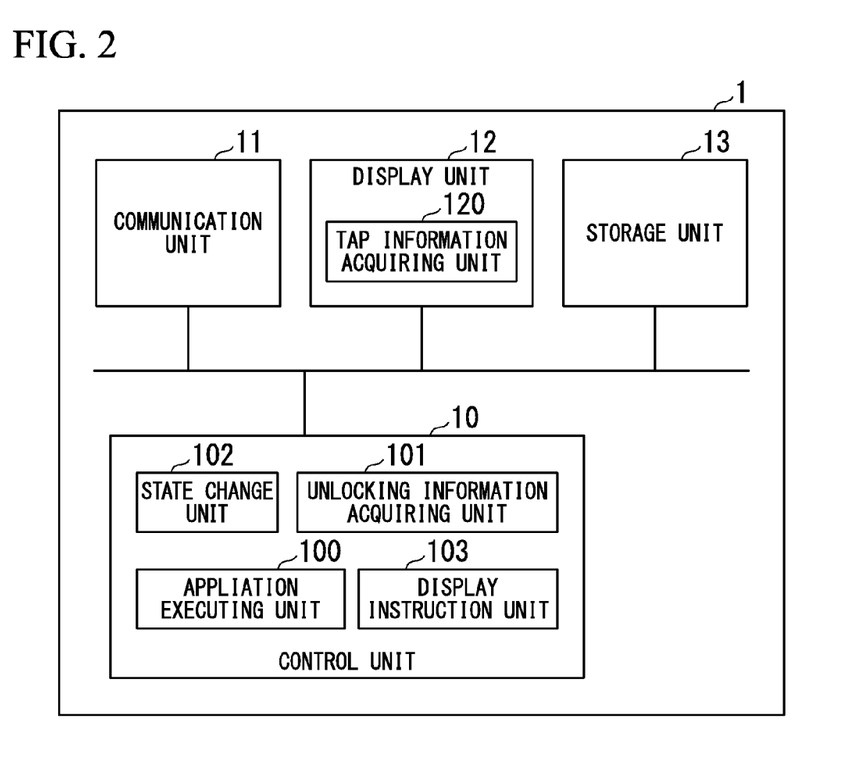
FIG. 2 is a diagram showing a concrete functional configuration of the information terminal device according to the first embodiment.

FIG. 2 is a diagram showing a concrete functional configuration of the information terminal device according to the first embodiment of the present invention. Here, functional units identical to those in FIG. 1 are given identical reference numerals.

As shown in FIG. 2, the information terminal device 1 includes a control unit 10, a communication unit 11, a display unit 12, and a storage unit 13.

The control unit 10 is a functional unit that may load an application program stored in the storage unit 13 and that performs various functions in accordance with the program. In particular, the control unit 10 executes various processes in response to individual user's requests via communication utilizing electric signals with other functional units and outputs relevant signals to the user.

The control unit 10 may be a functional unit formed by loading a predetermined program by using a generic CPU (Central Process Unit) or the like.

The communication unit 11 is a functional unit employing an interface (an antenna and its peripheral circuits) that performs radio information communication with a mobile phone line network (e.g., a radio communication line network such as a "3G line" or a line network equivalent thereto). The information terminal device 1 performs information communication with various information terminals via the communication unit 1 and the above line network.

The display unit 12 has a liquid crystal display, an organic EL display, or the like, and is utilized to make the user recognize the state of the information terminal device 1 or a result of each process in the information terminal device 1 as an image by means of such a display.

In addition, on a display screen of the display unit 12 which function as a so-called "touch panel display", the tap information acquiring unit 120 is provided as a touch sensor as described above.

However, the present embodiment is not limited to such a manner that employs the touch panel display. For example, the display unit 12 may be formed utilizing an ordinary liquid crystal panel and the tap information acquiring unit 120 may be formed utilizing an ordinary push-down button.

The storage unit 13 is a functional unit that stores and memorizes an OS (Operation System) program, various application programs, and various data (telephone numbers, an address book, electronic contents, etc.). Furthermore, in the present embodiment, the storage unit 13 may be utilized as a storage area in which the registered unlocking information is stored.

The control unit 10 also includes an application executing unit 100, an unlocking information acquiring unit 101, a state change unit 102, and a display instruction unit 103.

The application executing unit 100 is a functional unit that loads a predetermined application program stored in the storage unit 13 or the like and executes a process according to the program, so as to implement the relevant application.

For example, if loading an application program for email, the application executing unit 100 is a functional unit that implements an email function. While an application is currently available, the application executing unit 100 can further load another application program so that different applications are available in parallel.

The display instruction unit 103 is a functional unit that displays a predetermined display image on the display unit 12. More specifically, while the application executing unit 100 is executing a predetermined application, the display instruction unit 103 displays an image generated by the application, so that the user visually confirms the status of the relevant process.

For example, while the application for mail is being executed, the display instruction unit 103 displays an image utilized to write an email message or displays a notification icon that communicates email reception. While the application for a map is being executed, the display instruction unit 103 may display a required map and an icon that indicates the location of the user on the display unit 12 so that the user can recognize the current location.

In addition, the display instruction unit 103 may display a predetermined image in accordance with a variation in the status of the information terminal device 1. A specific example thereof will be described later.

Here, the application being executed may generate no image due to a multitask function or the like. Even in such a case, when an instruction to output the execution state is issued from the user so as to confirm that the application is being executed, the display instruction unit 103 can display a predetermined image on the display unit based on the instruction.

Figure 3:
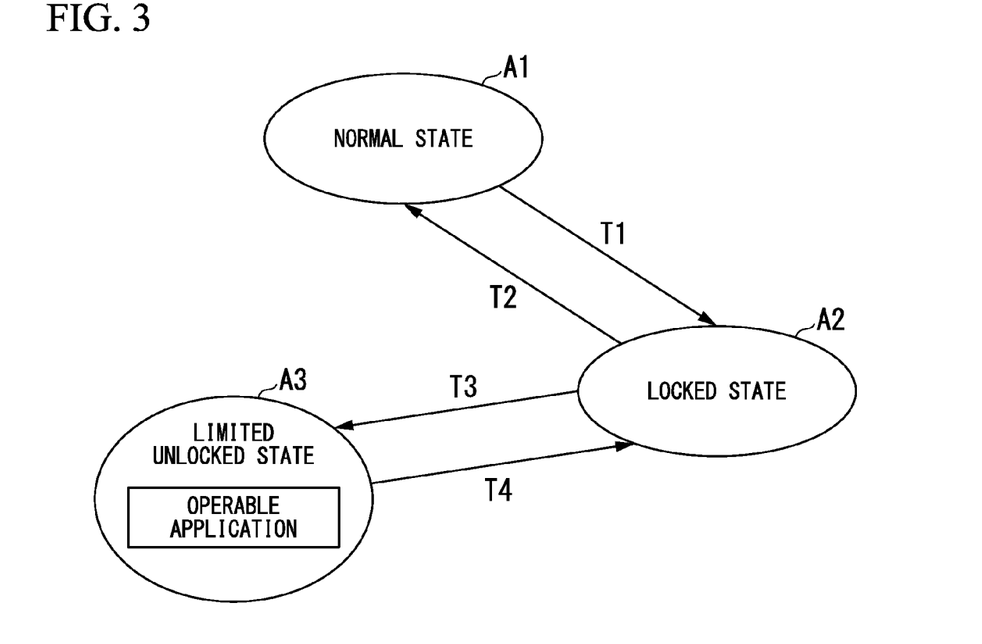
FIG. 3 is a diagram that shows the possible state transitions of the information terminal device of the first embodiment.

FIG. 3 is a diagram that shows the possible state transitions of the information terminal device of the first embodiment.

Below, the states that the information terminal device of the present embodiment can be in will be explained. As shown in FIG. 3, the information terminal device 1 of the present embodiment can be in at least three states such as a normal state (A1), a locked state (A2), and a limited unlocked state (A3).

However, the information terminal device 1 of the present embodiment may be in a state other than the above states.

In the present embodiment, the normal state (A1) is a state in which the user can freely operate applications executed by the application executing unit 100 without restriction.

That is, when the information terminal device 1 is in the normal state A1, the user can operate every application which is executed by the application executing unit 100.

The locked state (A2) is a state in which the user can operate no application executed by the application executing unit 100. That is, when the information terminal device 1 is in the locked state (A2), the user can operate no application. Such a function of shifting to the locked state is popularly employed for the purpose of preventing erroneous operation or in consideration of security.

If the information terminal device 1 is provided with a separate hard key (e.g., a push-down button or a slide type button), the information terminal device 1 may accept a predetermined operation via the hard key even when it is in the locked state.

The limited unlocked state (A3) in the present embodiment is a state in which the above locked state has been limitedly released with respect to part of the applications. That is, when the information terminal device 1 is in the limited unlocked state (A3), the user can operate only a specific application, where the user cannot operate the other functions as in the locked state A2.

Here, before shifting to the limited unlocked state, predetermined information (explained later) utilized to identify the application to be operated in a limited manner is acquired separately.

Below, conditions for the transition between the states shown in FIG. 3 will be explained.

When the present device is in the normal state A1 and a transition condition T1 is satisfied, the state change unit 102 changes the state of the information terminal device 1 from the normal state A1 to the locked state A2.

The transition condition T1 may be defined such that a certain operation as an instruction to shift to the locked state A2 has been input by the user, or that no operation has been input into the tap information acquiring unit 120 (as an operation unit) for a specific period of time.

On the other hand, when the present device is in the locked state A2 and a transition condition T2 is satisfied, the state change unit 102 changes the state of the information terminal device 1 from the locked state A2 to the normal state A1.

The transition condition T2 may be defined such that the user performed an authentication process based on a predetermined unlocking operation and the authentication has been established (a specific unlocking operation will be described later).

When the present device is in the locked state A2 and a transition condition T3 is satisfied, the state change unit 102 of the present embodiment changes the state of the information terminal device 1 from the locked state A2 to the limited unlocked state A3.

The transition condition T3 may be defined such that the user performed an authentication process based on a unlocking operation, that differs from the above-described unlocking operation, and the relevant authentication has been established.

Additionally, when the present device is in the limited unlocked state A3 and the state change unit 102 detects termination of the application which has been determined to be operable in this limited unlocked state, the state change unit 102 changes the state of the information terminal device 1 to the locked state A2. That is, the state change unit 102 may utilize a transition condition T4 such that when the application which the user can operate in the limited unlocked state A3 has been terminated, the locked state A2 is automatically restored.

According to such a process, when the target for the application, which can be limitedly operated, has disappeared, the state change unit 102 can automatically continue a status in which the applications other than the terminated application are still not operable.

Such a transition condition T4 may also be defined such that a certain operation as an instruction to be shifted to the locked state A2 has been input by the user, or that no operation has been input into the tap information acquiring unit 120 (as an operation unit) for a specific period of time.

Although it is not shown in the drawings, the state change unit 102 of the present embodiment may directly change the relevant state from the normal state A1 to the limited unlocked state A3, or similarly, from the limited unlocked state A3 to the normal state A1.

Next, the above-described unlocking operation will be explained in detail. Generally known information terminal devices may employ an unlocking operation in which the user inputs a password registered by the user in advance onto an authentication screen. In the present embodiment, the unlocking operation includes a user's input operation by repeating the tapping operation several times.

The state change unit 102 of the present embodiment performs the authentication process by determining whether or not the tap information, which is obtained based on a rhythm pattern obtained by the tapping operation repeated several times (called "tap pattern" below), coincides with the predetermined unlocking tap information. If it is determined that the tap information coincides with the unlocking tap information, the state change unit 102 changes the present device from the locked state A2 to the normal state A1 or the limited unlocked state A3.

Figure 4:
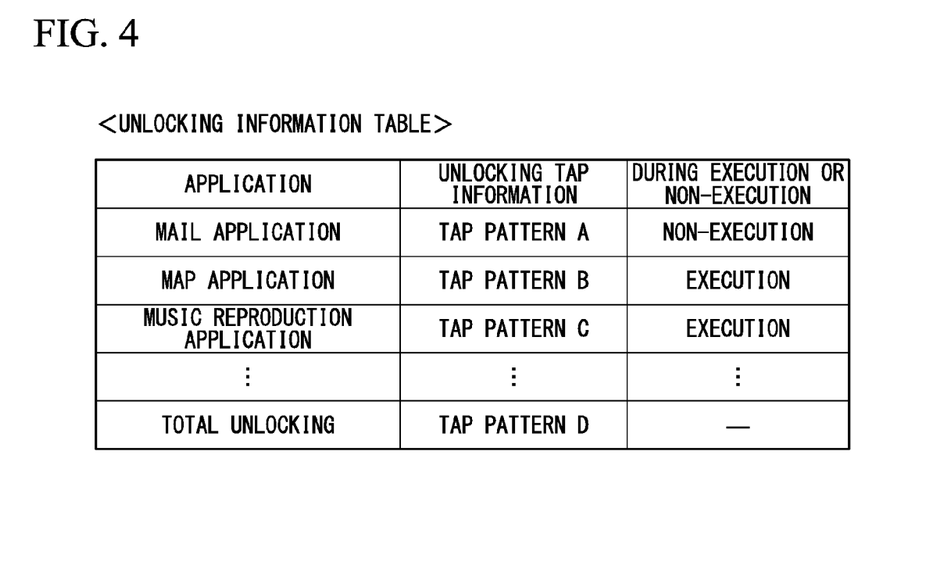
FIG. 4 is a diagram that shows a table of the unlocking information in the first embodiment.

FIG. 4 is a diagram that shows a table of the unlocking information in the first embodiment.

The state change unit 102 refers to the unlocking information obtained by the unlocking information acquiring unit 101 and performs the authentication process by determining whether or not the unlocking information coincides with the predetermined unlocking tap information.

The unlocking information may be the unlocking information table as shown in FIG. 4, which is an information table in which the individual applications available in the information terminal device 1 are associated with corresponding predetermined unlocking tap information items.

The state change unit 102 performs the authentication process so as to satisfy the transition condition T2 or T3 by referring to the unlocking tap information registered in the unlocking information table.

Here, the unlocking tap information items registered in the unlocking information table each function as an unlocking key for the corresponding application available in the information terminal device 1. That is, when the tap information produced by the user's tapping operation coincides with any unlocking tap information item registered in the unlocking information table, the state change unit 102 changes the relevant state to the limited unlocked state A3 in which the application, which is associated with the relevant unlocking tap information item in the unlocking information table, is limitedly available.

For example, in a case utilizing FIG. 4, when the user has input the tap pattern B via the tap information acquiring unit 120, the state change unit 102 changes the state of the information terminal device 1 from the locked state A2 to the limited unlocked state A3. Accordingly, in the limited unlocked state A3 set by the state change unit 102, the map application associated with the tap pattern B is limitedly available.

In the present embodiment, the unlocking information table may be stored in the storage unit 13 and the unlocking information acquiring unit 101 may acquire the unlocking information by referring to the unlocking information table stored in the storage unit 13.

The unlocking information table shown in FIG. 4 also stores information that indicates whether or not each of the individual applications (available in the present device) is being executed by the application executing unit 100 in a manner such that the information is associated with the relevant application (see the third column of the table in FIG. 4).

When the execution of any application has started due to a user's operation, the application executing unit 100 registers information that the relevant application is being executed, with the unlocking information table. When the execution of the application has been terminated due to a user's operation, the application executing unit 100 registers information that the relevant application is not being executed, with the unlocking information table.

If the tap information acquired by the tap information acquiring unit 120 coincides with any one of the unlocking tap information items shown in FIG. 4 and the transition condition T3 (explained below) is satisfied, then the state change unit 102 of the present embodiment changes the state of the present device from the locked state A2 to the limited unlocked state A3 in which at least the relevant application is operable.

As the transition condition T3, the state change unit 102 employs a condition that the application associated with the relevant unlocking tap information was being executed when the state was shifted to the locked state A2. Here, the state change unit 102 determines "whether or not the application was being executed when the state was shifted to the locked state A2" with reference to the unlocking information table in FIG. 4.

That is, when the user has performed an unlocking operation, the state change unit 102 limitedly unlocks the application targeted by the user only if the application was used immediately before the relevant state was changed to the locked state A2.

Accordingly, the information terminal device 1 can apply a restriction onto the application itself to be limitedly unlocked.

If such a restriction is not applied, when there are lots of applications registered with the unlocking information table, a possibility that a random tapping operation performed by a stranger incidentally coincides with any one of the unlocking tap information items associated with the individual applications is enhanced. However, when the application which can be limitedly unlocked is restricted to one that was used by the user immediately before the shift to the locked state A2, the possibility that the locked state is released by a stranger's random tapping operation is greatly reduced.

In addition, it is known that the purpose of the user's unlocking operation is almost to use the application which the user has previously activated again. Therefore, even when the application to be limitedly unlocked is restricted to one that was operated immediately before the state was shifted to the locked state A2, no considerable inconvenience is imposed on the user.

As shown in FIG. 4, not only the unlocking tap information utilized to limitedly unlock the application, but also unlocking tap information utilized for total unlocking (i.e., shift from the locked state A2 to the normal state A1) may be registered in the unlocking information table of the present embodiment.

In case of FIG. 4, when the user has input the tap pattern D via the tap information acquiring unit 120, the state change unit 102 changes the state of the information terminal device 1 from the locked state A2 to the normal state A1.

Figure 5:
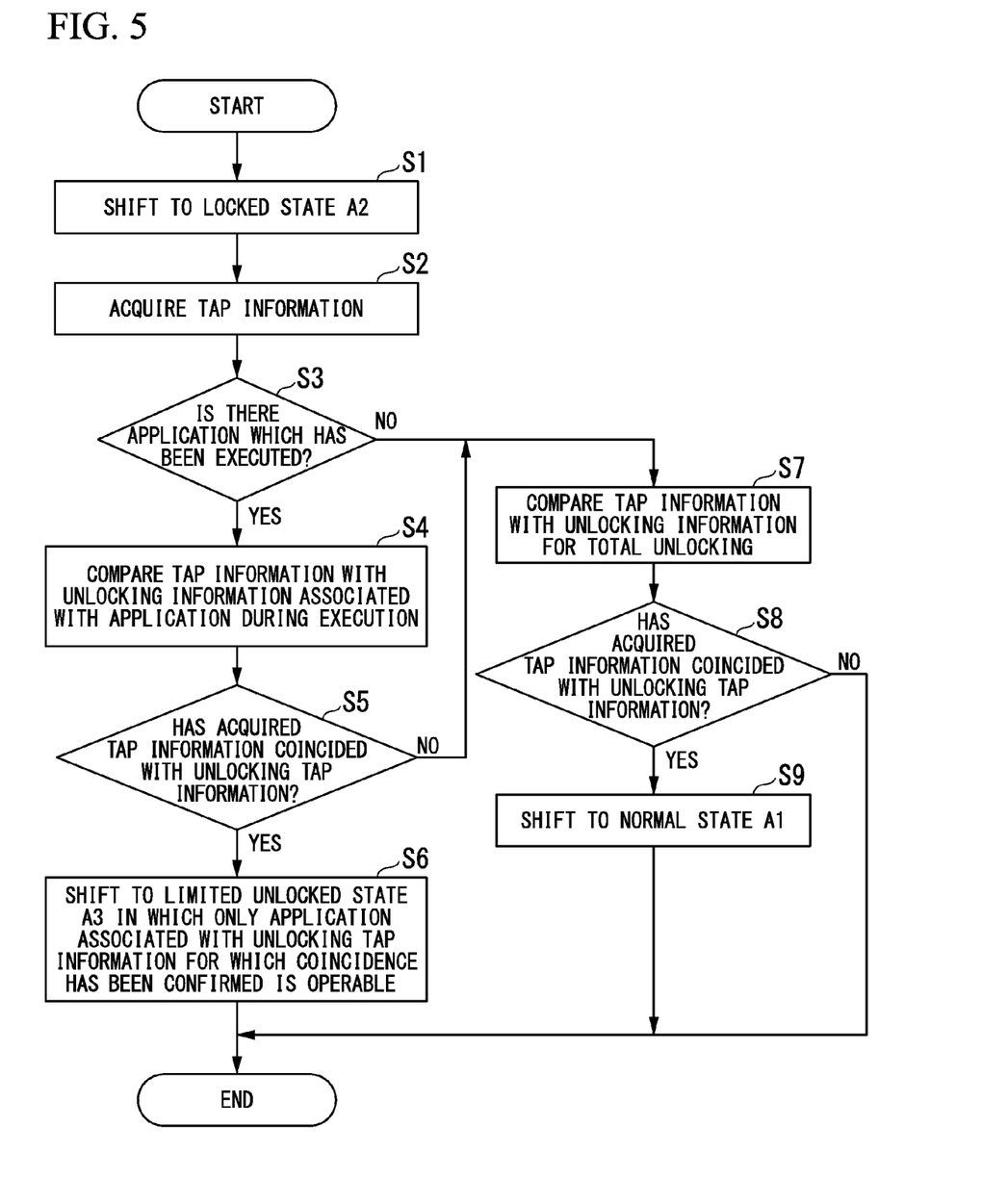
FIG. 5 is a first diagram that shows an operation flow for the state change unit in the first embodiment.

FIG. 5 is a first diagram that shows an operation flow for the state change unit in the first embodiment. With reference to the operation flow of FIG. 5, a process in which the information terminal device 1 is shifted from the locked state A2 to the limited unlocked state A3 or the normal state A1 will be explained.

As a precondition for the operation flow, it is assumed that the information terminal device 1 is in the normal state A1 and a predetermined period of time has elapsed during which no user's input operation has been detected in the tap information acquiring unit 120. Accordingly, the state change unit 102 changes the state of the information terminal device 1 to the locked state A2 (see step S1).

In the information terminal device 1 having the locked state A2, no application can be operated by the user. In order to use a specific application, the user performs an input using a tapping operation by means of the tap information acquiring unit 120. Then the tap information acquiring unit 120 acquires the tap information based on the user's operation (see step S2).

The state change unit 102 then determines whether or not there is an application which was being executed by the application executing unit 100 immediately before the state was shifted to the locked state A2 in step S1 (see step S3).

The state change unit 102 performs the above determination in step S3 with reference to the unlocking information table which the unlocking information acquiring unit 101 has acquired separately.

In step 3, "during execution or non-execution" (see FIG. 4) is referred to for each of the individual applications, and if it is determined that there is an application having the attribute of "during execution", the state change unit 102 performs the authentication process by comparing the tap information acquired in step S2 with the unlocking information associated with the application which is being executed (see step S4).

When there are a plurality of applications which are being executed, the state change unit 102 individually compares the tap information acquired in step S2 with the unlocking information associated with each application which is being executed.

Here, the state change unit 102 performs the authentication in step S4 with reference to the unlocking information table acquired by the unlocking information acquiring unit 101.

Below, the authentication process performed by the state change unit 102 in step S4 will be explained in more detail.

As the tap information acquired by the tap information acquiring unit 120, the number of individual tap actions, each time interval between subsequent tap actions, and the arrangement of the tap actions are obtained based on the user's tapping operation. On the other hand, in the unlocking information table acquired by the unlocking information acquiring unit 101, the number of individual tap actions, each time interval between subsequent tap actions, and the arrangement of the tap actions are stored in advance, for each unlocking tap information item.

The state change unit 102 computes the degree of matching between the acquired tap information and each unlocking tap information item with respect to the number of individual tap actions, each time interval between subsequent tap actions, and the arrangement of the tap actions. If the degree of matching exceeds a predetermined threshold, the state change unit 102 determines that the acquired tap information and the relevant unlocking tap information coincide with each other and terminates the authentication process.

In the present embodiment, the authentication process may be performed in a manner other than that described above if an equivalent purpose can be achieved. Additionally, any algorithm of computing the degree of matching may be employed if the goals of the authentication process can be achieved.

According to the comparison in step S4, the state change unit 102 determines whether or not the tap information acquired in step S2 has coincided with any unlocking tap information item associated with the application which is being executed (see step S5).

If the tap information acquired in step S2 coincides with any unlocking tap information item, the state change unit 102 changes the state of the information terminal device 1 to the limited unlocked state A3 in which only the application associated with the unlocking tap information for which the coincidence has been confirmed is operable (see step S6).

As described above, the state change unit 102 executes the authentication process based on the user's tapping operation and can make only a specific application detected by the tapping operation be limitedly available, among the applications used by the user immediately before the shift to the locked state A2.

In contrast, if it is determined in step S3 that there is no application which is being executed, or if the tap information acquired in step S2 coincides with no unlocking tap information associated with each application that is being executed (in step S5), then the operation explained below is performed.

That is, in such a case, the state change unit 102 compares the tap information acquired in step S2 with the unlocking tap information for the total unlocking (see the tap pattern D in FIG. 4) (see step S7).

The state change unit 102 then determines whether or not the tap information acquired in step S2 coincides with the unlocking tap information for the total unlocking (see step S8).

If the tap information acquired in step S2 coincides with the unlocking tap information for the total unlocking, the state change unit 102 changes the state of the information terminal device 1 to the normal state A 1 in which all applications are available (see step S9).

As described above, according to the authentication process utilizing the user's tapping operation, when the relevant tapping operation coincides with the unlocking tap information for the total unlocking, the state change unit 102 releases the locked state so that the normal operation can be performed.

If the tapping operation does not coincide with the unlocking tap information for the total unlocking, the state change unit 102 determines that the input tap information is invalid and terminates the operation of the flow without performing any state change.

As described above, the information terminal device 1 has a function of unlocking a limited target to be available (i.e., producing a limited unlocked state). Therefore, even if tap information which requires secrecy is not hidden during the authentication process, the risk for the leakage can be minimized since the available application is limited.

In addition, since the user of the information terminal device 1 performs the authentication utilizing the tapping operation, the required operation is simpler in comparison with popular authentication processes by inputting a password or the like.

Furthermore, since any application to be available in the limited unlocked state can be selected utilizing the corresponding tap pattern, the above-described simplicity for the operation is not impaired when the application which the user desires to operate is limitedly unlocked.

Figure 6:
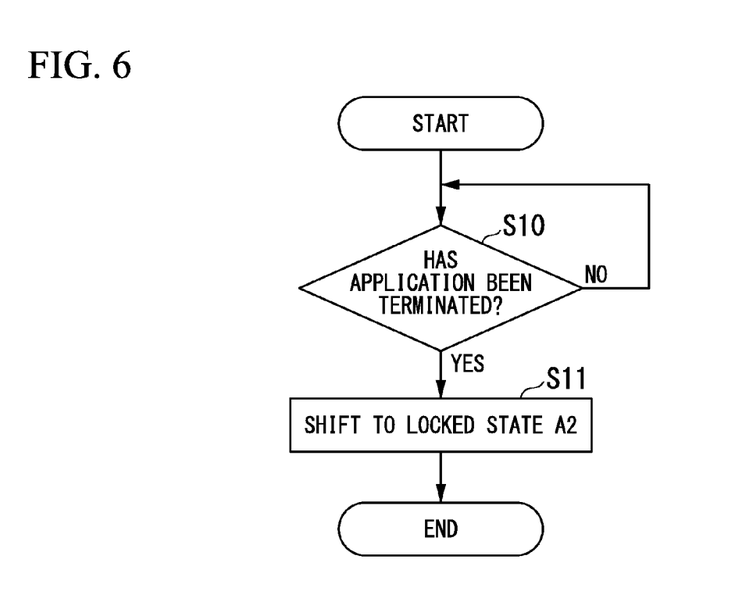
FIG. 6 is a second diagram that shows an operation flow for the state change unit in the first embodiment.

FIG. 6 is a second diagram that shows an operation flow for the state change unit in the first embodiment.

Below, with reference to the operation flow of FIG. 5, a process in which the information terminal device 1 is shifted from the limited unlocked state A3 to the locked state A2 will be explained.

As a precondition for the operation flow, it is assumed that the information terminal device 1 is in the limited unlocked state A3. Under this condition, the state change unit 102 determines whether or not the application which is operable in the limited unlocked state A3 has been terminated (see step S10). Accordingly, if the relevant application has not yet been terminated by the user's operation, the above determination is repeated in step S10.

If it is determined that the application which is operable in the limited unlocked state A3 has been terminated, the state change unit 102 changes the state of the information terminal device 1 to the locked state A2 (see step S11).

As described above, when the user has terminated the application which was being limitedly unlocked, the information terminal device 1 immediately shifts to the locked state. Therefore, the user needs not to perform a separate operation to produce the locked state and thus can maintain the locked state of the other applications.

According to the information terminal device 1 of the present embodiment, it is possible to provide an information terminal device having a locking function that minimizes the risk of information leakage without inconveniencing the user.

The information terminal device 1 of the present embodiment also has the following functions.

At the same moment when the state change unit 102 changes the state of the information terminal device 1 to the limited unlocked state, the display control unit 103 displays on the display unit 12, a display image pertaining to the application which becomes available due to such a state change.

When the information terminal device 1 is in the locked state A2, the display control unit 103 displays on the display unit 12, a dedicated display screen (lock screen) that indicates that the information terminal device 1 is in the locked state A2, similar to popular information terminal devices.

Here, it is assumed that the user has input a predetermined tapping operation (corresponding to the tap pattern B) so that the map application has been limitedly unlocked. In this case, the display control unit 103 terminates the lock screen and displays on the display unit 12, a display image pertaining to the map application (e.g., map information that indicates the user's location).

Accordingly, the user can visually confirm that the authentication has been established as the user intended and can also use the desired application immediately after the limitedly unlocking.

Furthermore, the present embodiment is not limited to the above-described modes. For example, when the music reproduction application is limitedly unlocked, if no image needs to be displayed on the display unit 12 for the operation of this application, display of an image pertaining to the relevant operation can be omitted.

Second embodiment

Figure 7:
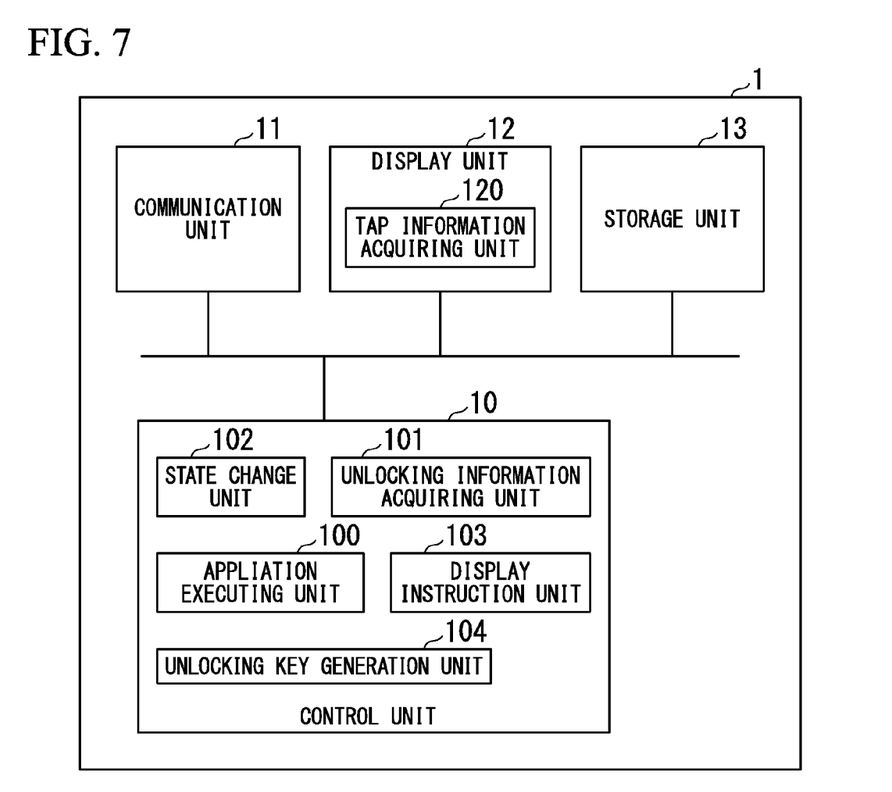
FIG. 7 is a diagram showing a concrete functional configuration of an information terminal device according to a second embodiment of the present invention.

FIG. 7 is a diagram showing a concrete functional configuration of an information terminal device according to a second embodiment of the present invention.

The information terminal device according to the second embodiment will be explained below.

In addition to the application executing unit 100, the unlocking information acquiring unit 101, the state change unit 102, and the display instruction unit 103 included in the control unit 10 of the first embodiment, the control unit 10 of the information terminal device 1 in the second embodiment further includes an unlocking key generation unit 104 which generates and updates every moment in accordance with the executing state of an application which is being executed, unlocking tap information as the unlocking key for the relevant application.

The unlocking information acquiring unit 101 of the second embodiment acquires the unlocking information based on the unlocking tap information which has been generated and updated every moment by the unlocking key generation unit 104.

Figure 8A:
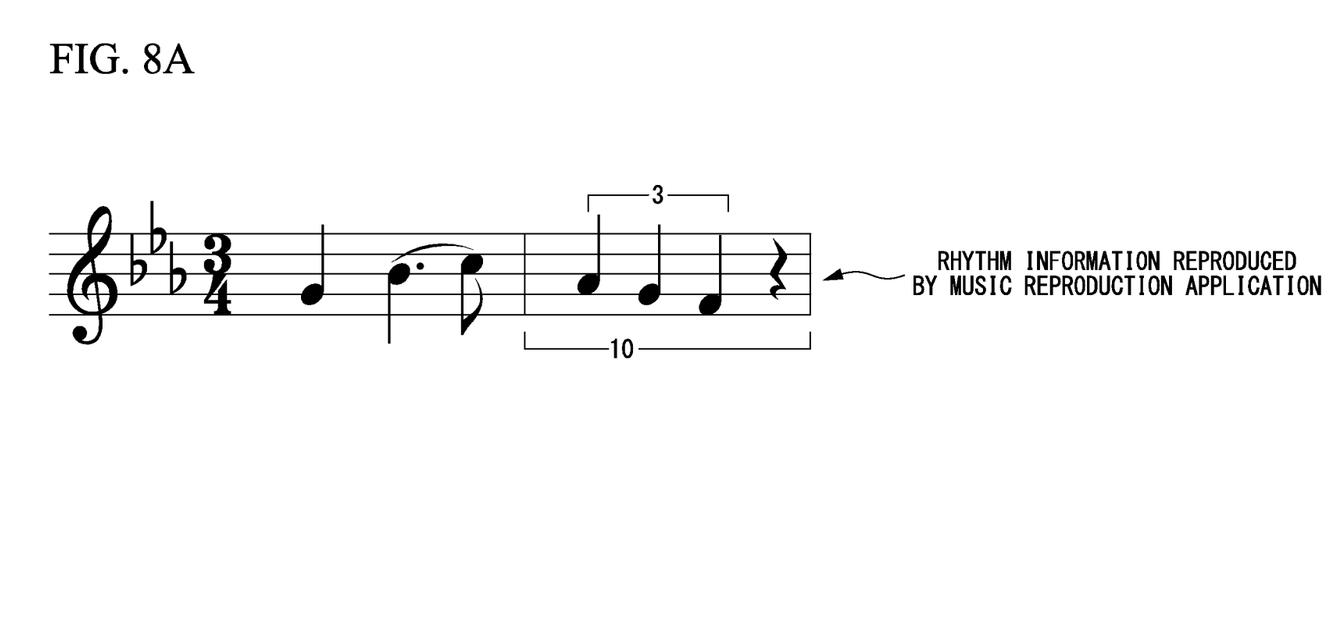
FIG. 8A is a diagram utilized to explain the function of the unlocking key generation unit according to the second embodiment.
Figure 8B:
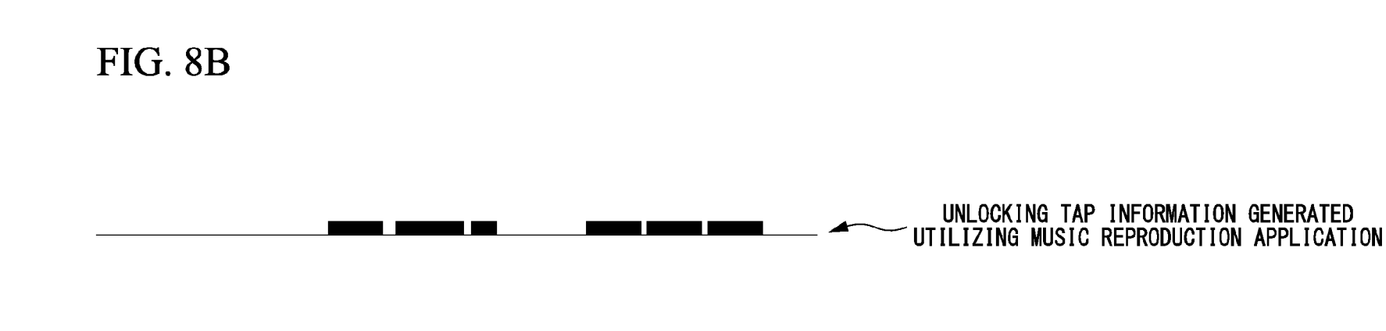
FIG. 8B is also a diagram utilized to explain the function of the unlocking key generation unit according to the second embodiment.

FIGS. 8A and 8B are diagrams utilized to explain the function of the unlocking key generation unit according to the second embodiment of the present invention.

When the information terminal device 1 is in the locked state A2, the unlocking key generation unit 104 determines whether or not there is any application (among the applications which have been being executed by the user) for which an unlocking key can be generated in accordance with the execution state of the relevant application.

For example, in the present embodiment, it is assumed that the unlocking key can be generated for the music reproduction application in accordance with the execution state of this application in a manner explained below. It is also assumed that the music reproduction application is being executed by the user.

Accordingly, the unlocking key generation unit 104 determines, when the information terminal device 1 is in the locked state A2, that the music reproduction application is being executed.

The unlocking key generation unit 104 then acquires rhythm information about music reproduced by the application executing unit 100. More specifically, the unlocking key generation unit 104 receives a music signal, which is output from the application executing unit 100 so as to reproduce the relevant music, and acquires the rhythm information by means of, for example, an extracting device which extracts a specific frequency signal (see FIG. 8A).

The unlocking key generation unit 104 generates and updates every moment, the unlocking tap information based on the acquired rhythm information (see FIG. 8B). Here, "generates and updates every moment" means that the unlocking key generation unit 104 continues the generation real time in accordance with the music which is being reproduced every moment.

That is, the unlocking key generation unit 104 generates the unlocking tap information which varies every moment in accordance with the reproduced music. The unlocking information acquiring unit 101 acquires the unlocking information with reference to the unlocking tap information which is generated every moment from the reproduced music.

The state change unit 102 may perform the authentication process as explained below, as a specific example of the present embodiment.

That is, the state change unit 102 compares the unlocking tap information, which is generated and updated every moment, with the tap information, which is input by the user in accordance with reproduced music so as to perform the relevant determination every moment. If the degree of matching has been satisfied continuously for a predetermined period of time, the state change unit 102 changes the state of the information terminal device 1 from the locked state A2 to the limited unlocked state A3.

In addition, the unlocking information acquiring unit 101 acquires the unlocking tap information generated as explained above, in association with the relevant music reproduction application.

For example, the unlocking tap information generated by the unlocking key generation unit 104 in accordance with the music which has been being reproduced is stored as the tap pattern C in FIG. 4.

Here, the unlocking information acquiring unit 101 of the present embodiment may apply the unlocking tap information, which was generated by the unlocking key generation unit 104 in accordance with the music which had been being reproduced, an application other than the music reproduction application.

Although the above explanation of the second embodiment employs the music reproduction application as an example, a similar function may be applied to an application other than the music reproduction application. For example, regarding a pedometer application, the unlocking information acquiring unit 101 acquires, from the steps of the user, rhythm information about the steps and produces the unlocking tap information based on the rhythm information.

In the information terminal device 1 having the above-described function, even if the tapping operation performed for the authentication is viewed by a stranger, the unlocking tap information varies every moment in accordance with the relevant music. Therefore, it is possible to further reduce the risk of leakage of the unlocking tap information.

The above-described information terminal device 1 includes a computer system.

The steps of each process of the information terminal device 1 are stored as a program in a computer-readable storage medium, and the process is performed when the relevant computer loads and executes the program.

The above computer readable storage medium is a magnetic disk, magneto optical disk, CD-ROM, DVD-ROM, semiconductor memory, or the like. In addition, the relevant computer program may be provided to a computer via a communication line, and the computer which received the program may execute the program.

Priority is claimed on Japanese Patent Application No. 2012-273907, filed Dec. 14, 2012, the contents of which are incorporated herein by reference.

INDUSTRIAL APPLICABILITY

In accordance with the present invention, it is possible to provide an information terminal device having a locking function that minimizes the risk of information leakage without inconveniencing the user.

REFERENCE SYMBOLS 1 information terminal device
10 control unit
100 application executing unit
101 unlocking information acquiring unit
102 state change unit 103 display instruction unit
104 unlocking key generation unit
11 communication unit
12 display unit
120 tap information acquiring unit
13 storage unit

What is claimed is:

1. An information terminal device comprising:
a tap information acquiring unit that acquires the tap information in accordance with a pattern of a tapping operation of a user;
an unlocking information acquiring unit that acquires the unlocking information in which unlocking tap information items, each of which functions as an unlocking key for each of applications available in the terminal device, are defined in association with corresponding applications; and
a state change unit wherein:
if a predetermined condition is satisfied, the state change unit changes the state of the terminal device from a normal state to a locked state in which the applications are not available; and
if the terminal device is in the locked state and the tap information acquired by the tap information acquiring unit coincides with any one of the unlocking tap information items of the unlocking information, the state change unit changes the state of the terminal device from the locked state to a limited unlocked state in which at least an application associated with a relevant unlocking tap information item is operable,
wherein one of the unlocking tap information items is generated and updated based on rhythm information of music reproduced in accordance with the execution of a music reproduction application.

2. The information terminal device in accordance with claim 1, further comprising:
a display instruction unit that displays a predetermined display image on a display unit,
wherein at a same moment when the state change unit changes the terminal device to the limited unlocked state, the display instruction unit displays on the display unit, the display image pertaining to the application which becomes available according to the change of the state.

3. The information terminal device in accordance with claim 1, wherein:
the unlocking information includes information that indicates whether or not each of the applications available in the terminal device is being executed; and
when the tap information acquired by the tap information acquiring unit coincides with any one of the unlocking tap information items, if the unlocking information includes information that indicates that the application associated with the relevant unlocking tap information has been being executed when the state was changed to the locked state, then the state change unit changes the state of the terminal device from the locked state to the limited unlocked state in which at least the relevant application is operable.

4. The information terminal device in accordance with claim 1, wherein:
when the terminal device is in the limited unlocked state, if the state change unit has detected termination of the execution of the relevant application, the state change unit changes the state of the terminal device to the locked state.

5. The information terminal device in accordance with claim 1, further comprising:
an unlocking key generation unit that generates and updates the unlocking tap information in accordance with an execution state of each application which is being executed,
wherein the unlocking information acquiring unit acquires the unlocking information based on the unlocking tap information which is generated and updated by the unlocking key generation unit.

6. An information terminal control method comprising:
acquiring tap information in accordance with a pattern of the tapping operation of a user;
acquiring unlocking information in which unlocking tap information items, each of which functions as an unlocking key for each of applications available in the information terminal device, are defined in association with corresponding applications;
changing, if a predetermined condition is satisfied, a state of the information terminal device from a normal state to a locked state in which the applications are not available; and
changing, if the information terminal device is in the normal state and the tap information acquired by the tap information acquiring coincides with any one of the unlocking tap information items of the unlocking information, the state of the information terminal device from the locked state to a limited unlocked state in which at least an application associated with a relevant unlocking tap information item is operable,
wherein one of the unlocking tap information items is generated and updated based on rhythm information of music reproduced in accordance with the execution of a music reproduction application.

7. A non-transitory computer readable medium which stores a program utilized to make a computer of an information terminal device function as:
a tap information acquiring unit that acquires tap information in accordance with a pattern of a tapping operation of a user;
an unlocking information acquiring unit that acquires the unlocking information in which unlocking tap information items, each of which functions as an unlocking key for each of applications available in the information terminal device, are defined in association with corresponding applications; and
a state change unit wherein:
if a predetermined condition is satisfied, the state change unit changes the state of the information terminal device from a normal state to a locked state in which the applications available in the information terminal device are not available; and
if the information terminal device is in the normal state and the tap information acquired by the tap information acquiring unit coincides with any one of the unlocking tap information items of the unlocking information, the state change unit changes the state of the information terminal device from the locked state to a limited unlocked state in which at least an application of said each of applications, associated with a relevant unlocking tap information item is operable,
wherein one of the unlocking tap information items is generated and updated based on rhythm information of music reproduced in accordance with the execution of a music reproduction application.

* * * * *